3,754,478
PROCESS OF OBTAINING TABERSONINE
Jacques Emile Poisson, 6 Avenue Georges Clemenceau,
Sceaux, France
No Drawing. Continuation-in-part of abandoned application Ser. No. 810,845, Mar. 26, 1969. This application July 16, 1971, Ser. No. 163,506
Int. Cl. C07d 33/48
U.S. Cl. 260—287 R                    6 Claims

ABSTRACT OF THE DISCLOSURE

Multi-step extraction process for obtaining tabersonine from alkaloid containing plant seeds of the Apocynaceae family: containing plant seeds Voacanga, Amsonia, and Stemadenia. Extraction is performed successively by solvents of decreasing selectivity in relation to the amounts of non-alkaloid materials, fatty materials, and other harmful substances in the drug or vegetable raw material.

---

The present application is a continuation-in-part of application Ser. No. 810,845 filed Mar. 26, 1969, now abandoned.

Tabersonine is a well known alkaloid whose structure and properties are disclosed in the prior art treatise The Alkaloids—Chemistry and Physiology, Academic Press (R. H. S. Manske, New York and London—vol. 8, pp. 339 and 342 and vol. 11, pp. 81—219—263). Tabersonine is described by Manske as being extracted from the Apocynaceae: Amsonia, Stemadenia and Tabernaemontana. However, no reference is made of the extraction of tabersonine from Voacanga and, before the present invention, no botanist had mentioned the presence of tabersonine in the Voacanga plant seeds although Manske mentions the extraction of various other alkaloids from Voacanga obtained from the trunk bark, the roots or the leaves of Voacanga.

The molecule of tabersonine is known to be of indolic structure and is related to the molecule of Vinca alkaloids, (Manske, supra).

The structure and properties of tabersonine is discussed in vol. 8, at pp. 416–417 of Manske. Data from mass spectra proves a molecular formula of $C_{21}H_{24}N_2O_2$ for tabersonine. The formula for the hydrochloride salt of this alkaloid is $C_{21}H_{24}N_2O_2ClH$ and this salt has a melting point of 196° C. (dec.) Manske also discloses optical properties of tabersonine by diochloride, giving a rotation of —310° in methanol [$\alpha_D$]. Further evidence of structure based upon infra-red, ultra-violet and nuclear magnetic resonance spectra is discussed.

The present invention relates to a process for obtaining tabersonine from plant seeds such as those of the Apocynacae: namely genera Voacanga, Amsonia, Stemadenia, and Tabernaemontana; the process according to the invention consists essentially in extraction of the plant seeds successively by solvents of decreasing selectivity in relation to the amounts of non-alkaloid materials, fatty materials and other undesired substances in the vegetable raw material of said seeds. This succession of solvents enables materials to be readily and progressively eliminated from loads which would be very troublesome if they had to be combined in a single solvent of high extractive power.

A description of one embodiment of the invention will now be given by way of illustration of the process of extracting tabersonine from plant seeds of the Apocynacae family until the alkaloid is isolated.

DESCRIPTION OF PROCESS ACCORDING TO THE INVENTION (1) Harvesting: Voacanga seeds are harvested when the fruit has reached maturity or slightly before complete maturity, namely as soon as the fruit has reached its normal volume. The harvesting of the seeds after dehiscence of the fruit becomes difficult in practice, although the alkaloid is still present at that time.

In practice, the seeds are isolated and freed from foreign bodies, fragments of pericarp of other vegetable debris which would form a useless load harmful to the satisfactory extraction yield or would represent a troublesome source of chlorophyll during purification.

The sorted and fully dried seeds are crushed to a fine powdery condition.

In similar fashion, seeds from other Apocynacae including Amsonia, Stemadenia, Tabernaemontana, and Vinca, are harvested, sorted, dried and crushed to fine powdery condition.

(2) Extraction: The extraction of tabersonine from powdered Voacanga seeds has the advantage of an excellent yield, of the order of 20 g. per kilogram, on total bases formed by 75–85% of pure product.

The process makes use of special features inherent in the nature of tabersonine which is a weak base and possesses a fragile molecule, other special features being due to the starting vegetable drug powder which contains a high proportion of fatty material.

2a. Operation 1: The powdered plant seeds obtained as described above, are treated with petroleum ether solvent in an extracting apparatus (Soxhlet type); the operation is performed in hot condition. Alternatively the extraction is carried out cold in a percolator or lixiviator apparatus.

The petroleum ether solvent (No. 1) containing the extract thus obtained is washed with 2% aqueous hydrochloric acid. Alternatively, either 5% acetic acid or 1% aqueous sulphuric acid is used. The crystalline precipitate which appears during the washing is eliminated by filtration.

The solvent phase is separated by decanting after the aqueous acid wash is brought back to a fresh charge of powder, while the aqueous acid washings from operation 1 are stored.

2b. Operation 2: The powder treated with solvent No. 1 in operation 1 is then treated with ethyl ether solvent (No. 2) and this ethyl ether solvent is in its turn exhausted by treatment with 2% aqueous hydrochloric acid. Alternatively, either 5% aqueous acetic or 1% aqueous sulphuric acid is used. Thereafter, the aqueous acid washings from operation 2 are stored.

2c. Operation 3: Finally, after treatment in operations 1 and 2 the treated powder is further treated with ethanol solvent acidified by 5% aqueous acetic acid solvent No. 3, until a negative Mayer reaction is obtained. This solvent No. 3 thus obtained is concentrated at reduced pressure to remove alcohol and is then diluted with water; a precipitate of various troublesome constituents appears which is separated by filtration by diatomaceous earth. Alternatively, conventional acids or kieselguhr is also used in place of diatomaceous earth. The limpid acid water thus obtained is separated by decanting.

The aqueous acid washings of the three exhausing solvents (operations 1, 2 and 3), are treated separately. Alternatively, they are combined; in industry there is no advantage in performing treatments separately, but the so-called enrichment system is used.

Extraction is also performed by alternative methods—i.e., the vegetable drug powder is alkalised by a solution of sodium or ammonium carbonate and exhausted by Soxhlet apparatus or by lixiviation or by maceration followed by percolation, by means of a solvent not miscible with water, such as benzene or ethyl-ether or acetic ether or a chlorinated solvent such as methylene chloride or chloroform. The single extracting solvent is exhausted by aqueous acid; the acid is either an organic acid, such as acetic or tartaric acid, or a mineral acid, such as sulphuric acid; extraction by hydrochloric water is more difficult, due to the solubility of the hydrochlorates in the chlorinated solvents, but it is suitable if use is made of a non-chlorinated solvent.

The crushed non-alkalised vegetable drug is also treated directly by aqueous hydrochloric acid, or aqueous acetic acid, such aqueous acids either containing or not containing a certain proportion of ethanol or methanol, for instance 10–20%.

3. Treatment of the acid waters: The aqueous acid washing originating from one or the other of the methods of extraction described hereinbefore are filtered after the solvent has been removed in vacuo: they are washed with ether and decanted into ampullas or by centrifugation or in a liquid-liquid separating rotary apparatus.

The so-obtained washings are then alkalised in the presence of an immiscible solvent, chloroform with aqueous ammonia. Alternatively a solution of sodium carbonate is used in place of ammonia.

These resultant alkaline waters are exhausted by the selected solvent: chloroform. Alternatively, benzene, methylene chloride or ethyl acetate is used. The process is continued until they no longer show a positive Mayer reaction.

The exhausting solvent is evaporated until dry and leaves behind a residue of total bases representing 1.8–2.2% by weight of the vegetable drug powder used.

4. Purification: The total bases obtained in step 3 are dissolved in a quantity of methanol containing hydrochloric acid in the proportion of 1 gram-molecule weight of the acid to 340 gram molecule weight of bases.

The solution of hydrochlorides thus obtained is diluted by sulphuric ether which rapidly causes hydrochloric crystals to appear which are separated by filtration.

A second crystallisation is performed by returning to the base and again performing the treatment as described hereinbefore.

The yield of twice purified base corresponds to about 75% by weight of total bases, i.e., 1.4–1.55% by weight of the starting drug.

Example.—300 grams of seeds of *Voacanga africana* were pulverised in a hammer crusher having a screen of mesh 0.8 mm.

The non-alkalised powder from the seeds was exhausted by petroleum ether in a Soxhlet apparatus.

The extract thus obtained was agitated with 2% aqueous hydrochloric acid; three washings were performed: 250 ml., 100 ml., and 100 ml. An abundant crystalline precipitate was formed at the boundary surface of the two liquids and separated by filtration.

The acid phase was alkalised by aqueous ammonia and exhausted by 250, 100, 100 ml. of ethyl ether. The combined ethers were washed with water, dried and evaporated; the residue weighed 1.28 grams.

The powder which had just been treated with petroleum ether was then exhausted in a second operation by ethyl ether and the solvent was also exhausted with aqueous hydrochloric acid. No further crystals were formed at the boundary surface between the two phases. The acid washings were alkalised and the bases were extracted therefrom by ether; after evaporation, 1.34 grams of bases were obtained.

In a third operation, the same powder was treated with ethanol containing 5% acetic acid until the effluent showed a negative Mayer reaction. The percolate was concentrated at reduced pressure to drive off the ethanol: 250 ml. of water were added to the acetic concentrate. Filtering was performed on kieselguhr and washing was performed with ether (100 ml. twice), whereafter alkalisation was performed by ammonia in the presence of methylene chloride and the alkaline aqueous phase was exhausted by that solvent. Evaporation was performed until dry yielding 0.139 gram of bases was obtained.

These bases obtained in these three operations were dissolved in a very small quantity of methanol containing the exactly calculated quantity of hydrochloric acid required to form their hydrochlorides, using for the calculation the molecular weight of 340.

By the careful addition of ethyl ether, crystals rapidly appeared which were dried on a porous sheet and re-crystallised by returning to the base and repeating the crystallisation operation in the presence of ether.

The crystals obtained were stored in a dry place screened from the light.

*Identification.*—The base obtained from the seeds of *Voacanga africana* was identified as tabersonine by its constituent properties which were those of tabersonine as reported in the literature, e.g. Manske (supra).

Identification of tabersonine from *Voacanga africana* seeds

Melting point: 196° C. (hydrochloride)
Optical rotation: $\alpha$ 578 (ethanol, c.=0.58)=—318°
UV spectrum $\lambda$ max. (Log $e$): 228 (4.03), 298 (4.02), 331 (4.16)
IR spectrum: $\lambda$ cm.$^{-1}$: 3365, 1690, 1630, 1615
Mass spectrum: m/e 336, (94%), 229 (36%), 122 (100%), 121 (69%), 107 (89%)
$M^+$ calculated for $C_{21}H_{24}N_2O_2$=336

*Analysis.*—p: $C_{21}H_{25}N_2O_2ClOH_2$: Calc. (percent): C, 64.52; H, 6.96; N, 7.16. Found (percent): C, 65.18; H, 6.73; N, 6.68.

The mass, infra-red and ultra-violet spectra could be superimposed on those of a tabersonine hydrochloride reference sample ($C_{21}H_{24}N_2O_2ClH$)

Melting point 196° C., $\alpha_D$—310° (ethanol).

Some advantages of the extraction from Voacanga seeds are:

(1) the tabersonine is present in a great quantity in the Voacanga seeds (25 to 30 g. per kg.);
(2) the tabersonine is free and present without being accompanied by substantial quantities of other alkaloids and no separation from other alkaloids is necessary.

What is claimed is:
1. Process for obtaining the alkaloid tabersonine from plants of the Voacanaga genus including at least one plant selected from *Voacanga africana, Voacanga thouarsii, Voacanga bracteate, Voacanga candiflora, Voacanga glabra,* and *Voacanga obtusa,* consisting esseentially of:
  (a) harvesting the sesends of Voacanga plant, freeing the seeds from foreign bodies, and crushing the resultant seeds to powder,
  (b) partially extracting tabersonine from the powder of seeds obtained in step (a) with a first solvent selected from the group consisting of petroleum ether and carbon terachloride, and separating the so-treated powder of seeds from the first solvent,
  (c) partially further extracting tabersonine from the separated powder of seeds treated according to step (b) with a second solvent consisting of ethyl ether, and separating the so-treated powder of seeds from said second solvent,
  (d) further extracting the separated powder of seeds treated according to step (c) with a third solvent consisting of ethanol containing from about 1% to about 5% acid, and separating the so-treated powder of seeds from said third solvent,
  (e) purifying the acidic ethanol third solvent after separation of the powder in step (d) by removal of ethanol and filtration, followed by washing with an immiscible organic solvent and thereafter making the separated aqueous phase alkaline and removal of the water therefrom to yield the desired dry tabersonine product.

2. Process according to claim 1, consisting essentially of the steps:
   (a) crushing the seeds of *Voacanga africana* to powder,
   (b) extracting the powder of step (a) with petroleum ether, and washing the extract therefrom with dilute aqueous hydrochloric acid; thereafter separating the crystalline precipitate which forms, and making the aqueous acid phase which remains alkaline with ammonia and washing same with ethyl ether; thereafter separating the ether phase and recovering the solid residue therefrom,
   (c) extracting the resultant powder according to the proess steps described in step (b) using ethyl ether in place of petroleum ether, separating the powder obtained therefrom and combining the solid residue obtained from the final ether phase with solid residue obtained in step (b),
   (d) treating the powder obtained from separation of ethyl ether solvent in step (c), with ethanol containing from about 1% to about 5% dilute aqueous acetic acid and separating the so-treated powder from said ether solvent, removing the ethanol therefrom, making the resultant solvent alkaline with dilute aqueous ammonia in methylene chloride and extracting the alkaline aqueous phase with methylene chloride, and thereafter separating the solid residue from the methylene chloride solvent,
   (e) combining the solid residues obtained in steps (b), (c) and (d) and dissolving the same in methanol containing hydrochloric acid and thereafter adding ethyl ether solvent thereto repeatedly until all the solid product crystallizes therefrom, and collecting the tabersonine product so obtained by removal of solvent therefrom.

3. Process for obtaining the alkaloid tabersonine from plants of the Voacanga genus including at least one plant selected from *Voacanga africana, Voacanga thouarsii, Voacanga bracteata, Voacanga candiflora, Voacanga glabra* and *Voacanga obtusa,* consisting essentially of the steps (a) harvesting the plant seeds and subsequently freeing the seeds from foreign bodies and then crushing the seeds to powder, (b) extracting the crushed seeds in a first operation by a first degreasing solvent selected from the group consisting of petroleum ether and carbon tetrachloride which solvent is adapted to remove not only the greases but also substantial percentage by weight of tabersonine alkaloid, (c) extracting the degreased powdered seeds in a second operation by treatment with a second degreasing solvent consisting essentially of ethyl ether, which solvent continues the extraction started by the first degreasing solvent, (d) further extracting the powdered seeds for the final treatment in a third operation by a third degreasing solvent consisting essentially of ethanol containing from about 1% to about 5% acid, and (e) separating the tabersonine from the solvents after extraction in steps (b), (c) and (d) and recovering the tabersonine therefrom.

4. The process according to laim 3, wherein the plant is *Voacanga africana.*

5. The process according to claim 1, wherein the plant is *Voacanga africana.*

6. The process according to claim 2, wherein the plant is *Voacanga africana.*

References Cited

Manske, The Alkaloids, Chemistry and Physiology, vol. VIII, Academic Press, pp. 225–227, 337–339, 342 and 416 (1965), QD 421 M3.

Manske, The Alkaloids, Chemistry and Physiology, vol. XI, Academic Press, pp. 8, 219 and 263 (1968), QD 421 M3.

Tomczyk, Chem. Abstracts, p. 8169, item No. 84, 936z, May 1968.

ALAN L. ROTMAN, Primary Examiner

U.S. Cl. X.R.
260—287 A, 295 A